United States Patent [19]
Brown et al.

[11] 3,952,088
[45] Apr. 20, 1976

[54] EFFLUENT TREATMENT

[75] Inventors: Peter John Nicholas Brown, Epsom; Clifford William Capp, Ewell, both of England

[73] Assignee: Petro-Tex Chemical Corporation, Houston, Tex.

[22] Filed: Oct. 1, 1974

[21] Appl. No.: 510,897

[30] Foreign Application Priority Data
Oct. 2, 1973 United Kingdom............... 45900/73

[52] U.S. Cl.................................. 423/499; 423/641
[51] Int. Cl.²........................ C01D 3/14; C01D 1/28
[58] Field of Search............................ 423/499, 641

[56] References Cited
UNITED STATES PATENTS

| | | | |
|---|---|---|---|
| 792,632 | 6/1905 | Tee................................. | 423/499 X |
| 3,139,327 | 6/1964 | Marshall et al..................... | 432/641 |
| 3,767,775 | 10/1973 | Tatara et al..................... | 423/499 X |

*Primary Examiner*—Edward Stern
*Attorney, Agent, or Firm*—N. Elton Dry; Kenneth H. Johnson

[57] ABSTRACT

The aqueous effluent from the dehydrochlorination of 3,4-dichlorobutene-1 is treated with ozone, and is then treated with chlorine until the pH is acidic.

5 Claims, No Drawings

EFFLUENT TREATMENT

The present invention relates to a process for reducing organic carbon content in the aqueous effluent from the dehyrdochlorination stage of the chloroprene process.

Chloroprene is usually produced by the dehydrochlorination of 3,4-dichlorobutene-1 in an aqueous alkaline medium. The chloroprene is removed by distillation and the spent aqueous medium from the dehydrochlorination is usually subjected to distillation and/or decantation to remove any major amounts of organic materials such as chloroprene and 3,4-dichlorobutene-1. The resulting aqueous effluent from this stage is essentially an aqueous solution of sodium chloride containing some sodium hydroxide and dissolved organic carbon compounds in quantities of up to a few thousand parts per million (ppm). This effluent is usually discharged to waste since the presence of traces of organic carbon compounds makes it unsuitable for use as feedstock in the electrolytic production of chlorine and caustic soda. The dissolved organics appeared to be a very complex mixture of substances of which only three compounds have been identified. These are 3,4-dihydroxybutene-1 1,4-dihydroxybutene-2 and 1 (or 2) -chloro-4-hydroxy-4-vinylclohexene-1 and together account for about 35% of the dissolved organic carbon. The removal of the dissolved organics from the effluent would make it a convenient feedstock for electrolysis thereby reducing the disposal problem created by the untreated effluent.

Treatment of aqueous solutions and water with either ozone or chlorine for the purpose of removing bacteria, odours and organics is well-known. It has however been found that treatment of the alkaline effluent from the chloroprene process with ozone converted some of the organics into carbon dioxide and reduced the organic carbon only to about 250–350 ppm. It has also been found that treatment of the effluent with chlorine followed by filtration reduced the organic carbon only to 500–600 ppm. Even saturation of the alkaline (pH 12–13) effluent with chlorine to a constant pH of about 5 achieved no further reduction in the organic carbon content. It was also found that treatment with either ozone or chlorine removed the same three compounds which have been identified above to account for about 35% of the dissolved organic carbon. Ozone did not appear to react with the effluent which had been acidified prior to the treatment. Thus, the conventional techniques failed to resolve the problem of reducing to a sufficient extent the organic carbon content in the effluent.

It has now been found that by suitably modifying the process of treating the effluent, the organic carbon level can be reduced to surprisingly low levels.

According to the present invention the process for treating an aqueous effluent, said effluent being the aqueous effluent from the dehydrochlorination of 3,4-dichlorobutene-1 in an aqueous alkaline medium to give chloroprene followed by removal of any major amount of organic materials by distillation and/or decantation, comprises initially treating the aqueous effluent with ozone followed by treatment of the ozonised effluent with chlorine until the pH is acidic.

In carrying out the process of the present invention it would be understood that before the actual chemical treatment, the suspended impurities would be removed by conventional techniques such filtration and/or decantation.

The step involving treatment with ozone, hereafter referred to as "ozonisation" may be carried out by using suitable gaseous diluents for ozone. Diluents such as air or oxygen are particularly preferred. The concentration of ozone in the diluent may for example by in the range 0.5 to 1.2% volume/volume.

Ozonisation is preferably continued until the absorption of ozone is substantially complete. The quantity of ozone required will of course depend on the quantity of organic matter in the effluent being treated, but may for example be in the range 0.01 to 0.02g ozone/g effluent.

The treatment with chlorine, hereafter referred to as "chlorination" may be carried out using gaseous chlorine.

The ozonisation and chlorination steps may be carried out below the boiling point of the effluent, but temperatures between 15°C and 100°C are preferred. The pH of the effluent at the beginning and throughout the ozonisation step is usually around 13. It is, however, desirable to bring the pH of the ozonised effluent to about 7 before chlorination is started. This pH adjustment may be achieved with hydrochloric acid either in the gaseous form or as an aqueous solution. The pH of the solution may be reduced to 1 as a result of acidification/neutralisation by hydrochloric acid followed by chlorination, but it is preferable to operate around a pH of 5–6 since strongly acidic solutions may give rise to corrosion problems.

The quantity of chlorine fed into the effluent per unit weight of effluent may vary over a moderately wide range, and may for example be 0.0005 to 0.0015 weight of chlorine per unit weight of effluent.

As indicated earlier, appropriate steps of filtration and/or decantation may be introduced before, during or after the ozonisation and/or chlorination of the effluent in order to remove any suspended impurities.

The effect achieved by a double treatment with ozone and with chlorine is surprising. As pointed out above, ozone or chlorine when used separately remove the three specific compounds identified above but very little else and yet, after an ozone treatment, when the three identified compounds have already been removed, chlorination gives a marked further reduction in the organic carbon content of the effluent.

The invention is further illustrated with reference to the following Example in which ppm is part by weight per million parts by weight.

EXAMPLE 1

Ozone in oxygen was passed into filtered aqueous effluent (containing 857 ppm total organic carbon) from the dehydrochlorination stage of the chloroprene process at 40°C until the absorption of ozone was virtually complete. Then, chlorine gas was passed into the solution at room temperature until the pH of the solution fell to 6. The total organic carbon remaining in solution was then 23 ppm.

EXAMPLE 2

Ozonolysis of the effluent was carried out continuously in a tower reactor consisting of a 1 in. diam, 36 in. high glass tube packed with ⅛ in. diam. porcelain Rasehig rings. Effluent was fed in at the top of the column and left from the base through a liquid seal which was arranged so as to keep the packed column full of liquid.

Ozonised air (20l/hr., 1.1% $O_3$ v/v concentration) was fed in at the base and the degree of absorption of the ozone checked by analysing the gas alkaline potassium iodine solution which was later acidified and the iodine liberated, determined by titration with 0.1 sodium thiosulphate solution. Calculation showed that 93–95% of the ozone passed in had been absorbed by the effluent or otherwise lost. The feed rate of effluent to the column was varied to determine the effect of residence time on reduction of the total organic carbon content of the effluent which was originally 880 ppm. The results obtained are given in the following table:

| Residence time in column (hr) | Total Organic Carbon (ppm) in treated Effluent |
| --- | --- |
| 0.05 | 865 |
| 0.16 | 825 |
| 0.5 | 790 |
| 2.0 | 360 |
| 2.66 | 335 |

Clearly, treatment was virtually complete in 2–3 hrs.

Chlorination of the ozonised effluent was carried out in a glass tower of similar size and arrangement to that used for the ozonolysis. Chlorine was fed in at the base at the rate of 1 l/hr at NTP and effluent introduced at the top of the column, leaving the base through a liquid seal arranged to keep the packed column flooded with liquid. The results obtained are shown in the following table:

| Residence time in column (min) | Total Organic Carbon* (ppm) in Treated Effluent |
| --- | --- |
| 26 | 32 |
| 19 | 35 |
| 15 | 25 |
| 10 | 25 |
| 6.3 | 20 |
| 4.4 | 41 |
| 2.8 | 57 |

*Original value 332 ppm.

Clearly the maximum reduction in total organic carbon was achieved in 6–10 minutes; shorter times were less effective.

EXAMPLE A

This is a comparative Example not according to the invention, showing the use of chlorination alone.

A 100 ml. sample of effluent containing 820 ppm organic carbon and 27 ppm. of carbonate carbon was chlorinated at about 22°C by passing in gaseous chlorine at the rate of 2.6 l/hr (measured at 0°C and 760 mm mercury) through a sintered glass gas distribution tube for 9 minutes. The pH value fell from 12.8 to 11.0. The chlorine was then displaced from the sample by passing in nitrogen when the pH quickly fell to 8 and then remained approximately constant. After filtering the sample through a No. 50 Whatman filter paper, it was again analysed for carbon content. It was found to contain 852 ppm of organic carbon and 35 ppm of carbonate carbon.

EXAMPLE B

This is a comparative Example, not according to the invention showing the use of ozonization alone.

A 200g sample of effluent containing 862 ppm organic carbon and 36 ppm carbonate carbon was treated exhaustively with ozone. Ozonised air (0.33 liter/min.) containing 1.1% v/v ozone was passed into the sample in a flask by means of a glass sintered gas distribution tube, at about 22°C. After 17½ hours, the sample was analysed and found to contain 260 ppm organic carbon and 660 ppm carbonate carbon.

We claim:

1. The process for treating an aqueous effluent for reducing the organic carbon level thereof, said effluent being essentially an aqueous solution of sodium chloride containing some sodium hydroxide and dissolved organic carbon compounds in quantities up to a few thousand parts per million and being the aqueous effluent from the dehydrochlorination of 3,4-dichlorobutene-1 in an aqueous alkaline medium to give chloroprene followed by removal of any major amount of organic materials by distillation and/or decantation, which comprises initially treating the aqueous effluent having a pH of about 13, with ozone, adjusting the pH of the ozonised effluent to about 7, followed by treatment of the ozonised effluent with chlorine until the pH is acidic.

2. The process according to claim 1 wherein the ozone is fed to the aqueous effluent in a diluent at a concentration of 0.5% to 1.2% volume/volume of diluent.

3. The process according to claim 1 wherein the effluent is treated with 0.01 to 0.02g ozone/g of effluent.

4. The process according to claim 1 wherein the treatments with ozone and chlorine are carried out at temperatures of between 15°C and 100°C.

5. The process according to claim 1 wherein the effluent is treated with 0.0005 to 0.0015 parts by weight of chlorine per unit weight of effluent.

* * * * *